United States Patent [19]

Thomas

[11] Patent Number: 5,855,667
[45] Date of Patent: Jan. 5, 1999

[54] GYPSUM MIXTURE CONTAINING HYDROPHOBIC ADDITIVE AND METHOD FOR HYDROPHOBING GYSUM

[75] Inventor: Bryan Thomas, Barry, United Kingdom

[73] Assignee: Dow Corning, Ltd.

[21] Appl. No.: 895,461

[22] Filed: Jul. 16, 1997

[30] Foreign Application Priority Data

Jul. 17, 1996 [GB] United Kingdom .................. 9614978

[51] Int. Cl.$^6$ .............................. C04B 24/40; C04B 11/00
[52] U.S. Cl. ................................ 106/781; 106/2; 106/711; 106/782; 106/287.13; 106/287.11; 106/661; 106/665
[58] Field of Search ................................ 106/2, 661, 782, 106/778, 781–665, 287.11, 287.13, 287.14, 711; 428/447, 703

[56] References Cited

U.S. PATENT DOCUMENTS

| | | | |
|---|---|---|---|
| 3,579,540 | 5/1971 | Ohlbausen | 260/33.4 |
| 4,136,687 | 1/1979 | Dabroski | 106/781 |
| 4,643,771 | 2/1987 | Steinbach et al. | 106/111 |
| 4,835,014 | 5/1989 | Roth et al. | 427/299 |
| 4,851,047 | 7/1989 | Demlehner et al. | 106/111 |
| 4,889,747 | 12/1989 | Wilson | 106/2 |
| 5,051,129 | 9/1991 | Cuthbert et al. | 106/2 |
| 5,073,195 | 12/1991 | Cuthbert et al. | 106/2 |
| 5,100,684 | 3/1992 | El-Nokaly et al. | 426/438 |
| 5,110,684 | 5/1992 | Cooper | 428/447 |
| 5,205,860 | 4/1993 | Narula et al. | 106/2 |
| 5,209,775 | 5/1993 | Bank et al. | 106/2 |
| 5,300,327 | 4/1994 | Stark-Kasley et al. | 427/387 |
| 5,336,715 | 8/1994 | Sejpka et al. | 524/765 |
| 5,421,866 | 6/1995 | Stark-Kasley et al. | 106/2 |
| 5,776,245 | 7/1998 | Thomas | 106/2 |

FOREIGN PATENT DOCUMENTS 2 062 607  5/1981  United Kingdom ............ C04B 31/44

*Primary Examiner*—Michael Marcheschi
*Attorney, Agent, or Firm*—Arne R. Jarnholm

[57] ABSTRACT

A gypsum mixture is disclosed which has hydrophobic additive substantially uniformly dispersed therein and which comprises gypsum, a first silane of the general formula $(RO)_3SiR$ or of the general formula $(RO)_2SiR_2$, and a second silane of the general formula $(RO)_3SiR'$ or of the general formula $(RO)_2SiRR'$, wherein each R is the same or different and represents a lower alkyl group, and R' represents a lower alkyl group which is substituted by a substituent selected from an amino, amino-lower alkyl-amino or dialkylenetri-amine group. Preferably, the first silane is methyltrimethoxysilane and the second silane is N-(2-aminoethyl)-3-aminopropyltrimethoxysilane. Also disclosed is a method for preparing said gypsum mixture.

16 Claims, No Drawings

GYPSUM MIXTURE CONTAINING HYDROPHOBIC ADDITIVE AND METHOD FOR HYDROPHOBING GYSUM

The present invention relates to a gypsum mixture containing hydrophobic additive and a method for preparing the same, more particularly to a gypsum mixture and method for preparing the same using organosilicon compounds as hydrophobic additive.

Water-resistance can be an important factor in production of certain gypsum products, for example plasterboard, gypsum blocks, and mouldings. Adsorption of water can cause staining, mildew, expansion and general deterioration and degradation of gypsum products. Hence, various techniques have been proposed to render gypsum products more hydrophobic, for example by surface treatment with hydrophobing agent by spraying, brushing or rolling hydrophobing agent thereon or by immersing gypsum products into a solution containing hydrophobing agent, or by admixing hydrophobing agent with gypsum powder prior to formation of gypsum products, for example prior to moulding blocks or forming boards.

The use of organosilicon compounds to improve the water-repellancy of a substrate by surface treatment thereof is well known in the art. U.S. Pat. No. 3,579,540 discloses use of a mixture containing alkylpolysiloxane and mineral acid; U.S. Pat. No. 4,835,014 discloses the application of water to a surface to be treated followed by a solution containing organosilicon compound and water-immiscible solvent; U.S. Pat. No. 5,051,129 discloses a masonry water repellant composition containing an aqueous solution of alkyltrialkoxysilane and silane coupling agent (see also U.S. Pat. No. 5,073,195 divided therefrom and U.S. Pat. No. 5,209,775); U.S. Pat. No. 5,205,860 discloses a surface treating composition containing water, alkyltrialkoxysilane, water soluble silane coupling agent and aqueous silicone emulsion containing organic tin salt; U.S. Pat. No. 5,300,327 (a continuation in part of U.S. Pat. No. 5,051,129) discloses a surface treatment composition comprising alkyltrialkoxysilane, amino- or quaternary ammonium organofunctional trialkoxysilane coupling agent, and a blend of petroleum and synthetic hydrocarbon waxes; and U.S. Pat. No. 5,421,866 discloses a surface treatment composition comprising alkoxysilane, amino- or quaternary ammonium organofunctional silane coupling agent, and isobutylene polymer or oligomer.

Surface treatment with hydrophobing agent can be a convenient method of increasing the water repellency of a pre-formed substrate, such as a pre-moulded gypsum block or plasterboard; however, after such treatment the hydrophobing agent is only dispersed throughout the surface layers of the substrate with the bulk of the substrate material remaining mainly untreated.

An alternative method for rendering a substrate water repellant is to admix hydrophobing agent with the substrate material, such as gypsum powder, prior to formation of the substrate, for example prior to moulding blocks or forming boards. Various such methods are known in the art and, as for the aforementioned surface treatment method, organosilicon compounds have been widely used as hydrophobing agents therein. GB 2062607A discloses manufacture of a gypsum hardened body from a mixed material comprising gypsum and slag with powdered additive coated with hydrophobic diorganopolysiloxane; U.S. Pat. No. 4,643,771 discloses production of water repellant plaster moulding by forming a foam of water, surfactant and polyalkylhydrogensiloxane, adding the foam to a water paste of plaster powder and letting the mixture set; U.S. Pat. No. 4,851,047 discloses a process for preparing water repellent articles from gypsum powder containing hydrophobic agents in which the hydrophobic agents are prepared by spray drying a mixture containing water, organopolysiloxane and water soluble film forming polymer; and U.S. Pat. No. 5,336,715 discloses water dilutable organopolysiloxane compositions for use as hydrophobing agents for materials, for example concrete, gypsum and paint, which comprises a salt of a water-soluble organic or inorganic acid, an organopolysiloxane having at least one SiC-bonded organic radical containing basic nitrogen, and an alkoxylated alcohol.

Pre-mixing of hydrophobing additive with substrate material provides substantially uniform dispersion of hydrophobing additive throughout the mixture and hence the body of the formed substrate.

U.S. Pat. No. 5,110,684 discloses a method of rendering masonry architectural building materials, for example gypsum, water repellent by incorporating into the material an additive which is a mixture of (i) water soluble silane coupling agent, e. g. N-(2-aminoethyl)-3-aminopropyltrimethoxysilane, and (ii) an emulsion which includes water, at least one surfactant and a siloxane fluid, e. g. linear methylhydrogen siloxane polymer, methylhydrogen-methylalkyl siloxane polymer, and copolymers thereof.

According to the present invention there is provided a gypsum mixture having hydrophobic additive substantially uniformly dispersed therein which comprises gypsum, a first silane of the general formula $(RO)_3SiR$ or of the general formula $(RO)_2SiR_2$, and a second silane of the general formula $(RO)_3SiR'$ or of the general formula $(RO)_2SiRR'$, wherein each R is the same or different and represents a lower alkyl group, and R' represents a lower alkyl group which is substituted by a substituent selected from an amino, amino-lower alkyl-amino or dialkylenetriamine group.

The term "lower alkyl" refers to alkyl groups having from one to six carbon atoms, for example methyl, ethyl, propyl, butyl, pentyl, hexyl and structural isomers thereof.

The term "dialkylenetriamine" refers to amino-lower alkyl-amino-lower alkyl-amino groups in which the lower alkyl groups preferably have from one to three carbon atoms, for example methyl, ethyl, and propyl.

Suitable examples of the first silane component of the present invention are methyltrimethoxysilane, methyltriethoxysilane, methyltripropoxysilane, ethyltrimethoxysilane, ethyltributoxysilane, propyltrimethoxysilane, propyltriethoxysilane, isobutyltrimethoxysilane, butyltriethoxysilane, hexyltrimethoxysilane, dimethyldimethoxysilane, dimethyldiethoxysilane, diethyldimethoxysilane, diisobutyldimethoxysilane, dibutyldiethoxysilane, and dihexyldimethoxysilane. Group R is preferably methyl or ethyl, and the most preferred first silane is methyltrimethoxysilane.

R' is preferably a propyl group substituted by an amino, an amino-lower alkyl-amino (for example 2-aminoethylamino), or dialkylenetriamine (for example diethylenetriamine) group. Preferred examples of the second silane component are 3-aminopropyltrimethoxysilane, 3-aminopropyltriethoxysilane, N-(2-aminoethyl)-3-aminopropyltrimethoxysilane, N-(2-aminoethyl)-3-amino-2-methylpropyldimethoxymethylsilane, 3-aminopropyldiethoxymethylsilane and trimethoxysilylpropyldiethylenetriamine, the most preferred being N-(2-aminoethyl)-3-aminopropyltrimethoxysilane.

Preferably, the ratio first silane:second silane in the gypsum mixture is from 1:1 to 9:1, for example from 2.33:1 to 4:1, by weight. The combined total amount of first and second silane present in the gypsum mixture is preferably from 0.5 to 2.0% by weight of gypsum. The above ratios and amounts of first and second silane are calculated in terms of pure materials. The second silane compounds used in the present invention are considerably more expensive than the first silane compounds; hence, the preferred ratios of first-:second silane can provide both high performance and cost effective hydrophobing additive.

The gypsum mixture of the present invention may also include a soluble surfactant, i.e. a soap. Soap facilitates aeration of the gypsum mixture during preparation and can thus be used to regulate and change the density of the gypsum mixture. However, addition of soap can diminish the hydrophobic properties imparted by the hydrophobic additives. If used, soap is typically present in an amount of approximately 0.1% by weight of gypsum.

The gypsum mixture of the present invention may further include organic (for example cellulosic or paper) or mineral/glass fibres in admixture to modify its physical properties.

According to the present invention there is also provided a method for preparing an aqueous gypsum mixture having hydrophobic additive substantially uniformly dispersed therein, which method comprises mixing in water gypsum, a first silane of the general formula $(RO)_3SiR$ or of the general formula $(RO)_2SiR_2$, and a second silane of the general formula $(RO)_3SiR'$ or of the general formula $(RO)_2SiRR'$, wherein each R is the same or different and represents a lower alkyl group, and R' represents a lower alkyl group which is substituted by a substituent selected from an amino, amino-lower alkyl-amino or dialkylenetriamine group.

The first and second silanes used in the method of the present invention are preferably non-emulsified; emulsions and emulsifying agents are by nature hydrophillic and their use can diminish the hydrophobic properties imparted to the gypsum mixture by the silanes.

According to the method of the present invention the gypsum, first silane, second silane, and optional surfactant are added to water and mixed. The order in which these ingredients are added to the water is not crucial, and hence no substantial modifications to conventional manufacturing processes are needed. The first and second silane can be pre-mixed prior to addition of the gypsum.

For formation of gypsum products, after mixing the gypsum mixture is allowed to set in a suitable cast, mould, or the like, to provide the desired product shape and dried in a drier or oven. For board production, the gypsum mixture is typically poured onto a conveyer belt, allowed to set, cut to length and dried. The conveyer belt may be covered with paper to provide paper coated board. The drying time varies according to the bulk of gypsum mixture to be dried, for example a moulded gypsum product such as a block may typically be dried for approximately 48 hours, whereas gypsum board may typically require only 2 hours of drying.

The present invention further provides gypsum product, for example gypsum blocks or plasterboard, formed from gypsum mixture of the present invention.

Embodiments of the present invention will now be described in detail by way of example.

EXAMPLE 1

Comparison of Gypsum Product Samples Containing Differing Amounts of the Same First and Second Silanes 1) Preparation of gypsum product samples Methyltrimethoxysilane (first silane) and N-(2-aminoethyl)-3-aminopropyltrimethoxysilane (second silane) mixtures were added to 260 ml of water, in different amounts for each test sample (see tables 1 to 3 below), and whisked. To this solution was added 400 g gypsum and the mixture whisked again. Sample blocks were prepared by pouring the gypsum mixture into 5×5×2 cm moulds and leaving for 25 minutes, followed by equilibration for 3 hours, from the time of mixing, at 95° C. to remove excess water. Equilibration was completed by storing the test samples at 40° C. overnight.

Comparative blank sample blocks were prepared by the method described above without addition of first and second silane additive to the gypsum mixture.

2) Sample testing

The mass of each sample block after equilibration was recorded, following which the blocks were immersed in water for 2 hours at constant hydrostatic pressure. Each sample block was then reweighed to give the amount of water adsorption (%).

3) Test results

The results of the sample testing described in 2) above are shown in Tables 1 and 2 below: N. B. First and second silane % are % by weight of gypsum.

TABLE 1

| GYPSUM LOT 1 | | |
|---|---|---|
| First Silane % | Second Silane % | Water Adsorption % |
| — | — | 32 |
| 0.7 | 0.3 | 1.8 |
| 0.35 | 0.15 | 2.7 |
| 0.8 | 0.2 | 6.5 |
| 0.4 | 0.1 | 4.3 |
| 0.38 | 0.62 | 6.3 |

TABLE 2

| GYPSUM LOT 2 | | |
|---|---|---|
| First Silane % | Second Silane % | Water Adsorption % |
| — | — | 34 |
| 0.5 | 0.5 | 3.5 |
| 0.6 | 0.4 | 3.2 |
| 0.7 | 0.3 | 2.8 |
| 0.8 | 0.2 | 4.9 |
| 0.95 | 0.05 | 20.0 |

EXAMPLE 2

Comparison of Gypsum Product Samples Containing Equal Amounts of Different First and Second Silanes 1) Preparation of gypsum product samples Gypsum product samples containing 2% by weight of a 7:3 mixture of methyltrimethoxysilane:second silanes A to D below were prepared according to the method of Example 1:

A—$(MeO)_3Si(CH_2)_3NH(CH_2)_2NH_2$ (i.e. as in Example 1)

B—$(EtO)_3Si(CH_2)_3NH_2$

C—$(MeO)_3Si(CH_2)_3NH_2$

D—$(MeO)_2.Me.SiCH_2CH(CH_3)CH_2NH(CH_2)_2NH_2$

Sample blocks were prepared and dried as per Example 1.

2) Sample testing

Sample blocks were tested as per Example 1.

3) Test results

The results of the sample testing are shown in Table 3 below:

TABLE 3

| Second Silane | Water Adsorption % |
|---|---|
| A | 1.9 |
| B | 2.5 |
| C | 1.7 |
| D | 4.8 |
| Blank | 32.3 |

Comparative Example 1

1) Preparation of gypsum product samples

Gypsum product samples were prepared and dried according to the method of Example 1 using the silanes of Example 1 but with either first or second silane added, not both. The amounts of first or second silane added to each sample are shown in Table 4 below.

2) Sample testing

Sample blocks were tested as in Example 1.

3) Test results

The results of the sample testing are shown in Table 4 below:

TABLE 4

| First Silane % | Second Silane % | Water Adsorption % |
|---|---|---|
| — | 1 | 30.8 |
| — | 0.5 | 30.2 |
| — | 0.25 | 31.2 |
| 1 | — | 5.8 |
| 0.5 | — | 11.2 |
| 0.25 | — | 28.6 |

First and second silane % are % by weight of gypsum.

That which is claimed is:

1. A gypsum mixture having hydrophobic additive substantially uniformly dispersed therein, said hydrophobic additive consisting essentially of a first silane selected from the group consisting of silanes of the general formula $(RO)_3SiR$ and of the general formula $(RO)_2SiR_2$, and a second silane selected from the group consisting of silanes of the general formula $(RO)_3SiR'$ and of the general formula $(RO)_2SiRR'$, wherein each R independently represents a lower alkyl group and R' represents a lower alkyl group which is substituted by a substituent selected from the group consisting of amino, amino-lower alkyl amino and dialkylenetriamine groups.

2. A gypsum mixture according to claim 1 wherein the first silane is selected from the group consisting of methyltrimethoxysilane, methyltriethoxysilane, methyltripropoxysilane, ethyltrimethoxysilane, ethyltributoxysilane, propyltrimethoxysilane, propyltriethoxysilane, isobutyltrimethoxysilane, butyltriethoxysilane, hexyltrimethoxysilane, dimethyldimethoxysilane, dimethyldiethoxysilane, diethyldimethoxysilane, diisobutyldimethoxysilane, dibutyldiethoxysilane, and dihexyldimethoxysilane.

3. A gypsum mixture according to claim 1 wherein R is selected from the group consisting of methyl and ethyl groups.

4. A gypsum mixture according to claim 1 wherein the first silane is methyltrimethoxysilane.

5. A gypsum mixture according to claim 1 wherein the R' lower alkyl group is a propyl group.

6. A gypsum mixture according to claim 1 wherein the second silane is selected from the group consisting of 3-aminopropyltrimethoxysilane, 3-aminopropyltriethoxysilane, N-(2-aminoethyl)-3-aminopropyltrimethoxysilane, N-(2-aminoethyl)-3-amino-2-methylpropyldimethoxymethylsilane, 3-aminopropyldiethoxymethylsilane and trimethoxysilylpropyldiethylenetriamine.

7. A gypsum mixture according to claim 6 wherein the second silane is N-(2-aminoethyl)-3-aminopropyltrimethoxysilane.

8. A gypsum mixture according to claim 1 which further includes soap.

9. A gypsum mixture according to claim 1 which further includes organic or mineral/glass fibres.

10. A method for preparing an aqueous gypsum mixture having hydrophobic additive substantially uniformly dispersed therein, which method comprises mixing in water, gypsum, a hydrophobic additive consisting essentially of a first silane selected from the group consisting of silanes of the general formula $(RO)_3SiR$ and of the general formula $(RO)_2SiR_2$, and a second silane selected from the group consisting of silanes of the general formula $(RO)_3SiR'$ and of the general formula $(RO)_2SiRR'$, wherein each R independently represents a lower alkyl group, and R' represents a lower alkyl group which is substituted by a substituent selected from the group consisting of an amino, amino-lower alkyl-amino and dialkylenetriamine group.

11. A method according to claim 10 wherein the first and second silanes are non-emulsified.

12. A gypsum product formed from gypsum mixture according to claim 1.

13. A gypsum product formed from gypsum mixture prepared according to a method of claim 10.

14. A gypsum mixture in accordance with claim 1 wherein said first silane and said second silane are respectively present in a weight ratio from 1:1 to 9:1.

15. A gypsum mixture in accordance with claim 14 wherein said first silane and said second silane are respectively present in a weight ratio from 2.33:1 to 4:1.

16. A gypsum mixture in accordance with claim 1 wherein said first silane and said second silane are present in an aggregate amount of from 0.5 to 2.0% by weight of said gypsum.

* * * * *